United States Patent
Osselmann et al.

(10) Patent No.: US 6,741,803 B2
(45) Date of Patent: May 25, 2004

(54) CIRCUIT AND PROCESS FOR REGULATING THE SPEED OF UNIVERSAL ELECTRIC MOTORS

(75) Inventors: Claus Osselmann, Kaltenberg (DE); Peter Hellmann, Obermeitingen (DE); Lutz Troeder, Türkenfeld (DE)

(73) Assignee: Hilti Aktiengesellschaft, Schaan (LI)

(*) Notice: Subject to any disclaimer, the term of this patent is extended or adjusted under 35 U.S.C. 154(b) by 0 days.

(21) Appl. No.: 10/231,607

(22) Filed: Aug. 29, 2002

(65) Prior Publication Data

US 2003/0044172 A1 Mar. 6, 2003

(30) Foreign Application Priority Data

Aug. 31, 2001 (DE) .......................... 101 42 732

(51) Int. Cl.$^7$ .............................. G05F 1/10; H02P 7/00
(52) U.S. Cl. ..................... 388/937; 388/806; 318/434
(58) Field of Search ...................... 318/17, 434, 772, 318/903, 461, 432; 388/903, 937, 800, 806, 815, 821, 822

(56) References Cited

U.S. PATENT DOCUMENTS

| 4,362,976 A | * | 12/1982 | Fujioka et al. | ............. 388/819 |
|---|---|---|---|---|
| 4,494,057 A | * | 1/1985 | Hotta | ........................ 388/821 |
| 4,719,395 A | * | 1/1988 | Aoi et al. | ................... 388/840 |
| 4,885,511 A | * | 12/1989 | Millauer et al. | ........... 318/434 |
| 5,015,928 A | * | 5/1991 | Yang | ........................ 318/250 |
| 5,714,861 A | * | 2/1998 | Hansen et al. | ............. 318/799 |
| 5,747,955 A | * | 5/1998 | Rotunda et al. | ........... 318/434 |
| 5,932,981 A | * | 8/1999 | Vrionis | ...................... 318/480 |
| 6,424,108 B1 | * | 7/2002 | Moller et al. | .............. 318/432 |

FOREIGN PATENT DOCUMENTS

JP 04193087 A * 7/1992 ............ H02P/5/06

* cited by examiner

Primary Examiner—Rina Duda
Assistant Examiner—Patrick Miller
(74) Attorney, Agent, or Firm—Sidley Austin Brown & Wood, LLP

(57) ABSTRACT

A process and a circuit (2) for regulating the speed of an electric motor (1) having a high speed (N1) to at least one additional lower speed (N2, N3, N4), whereby, in a first prioritized step, depending on a preselected speed (N1, N2), the regulation of the speed to a lower effective motor voltage (Ueff) has an upper limit, and in a second step, depending on the torque (M) needed for the regulation to this preselected speed (N1, N2), the effective motor voltage (Ueff) is regulated within the limited range.

7 Claims, 1 Drawing Sheet

CIRCUIT AND PROCESS FOR REGULATING THE SPEED OF UNIVERSAL ELECTRIC MOTORS

BACKGROUND OF THE INVENTION

The invention relates to a circuit and a process for regulating the speed of universal electric motors, particularly in portable power tools, to at least one additional, lower speed.

An additional lower speed, for a hand-held power tool, is normally achieved by a phase angle-controlled voltage control used to reduce the effective voltage in a series-wound electric motor. Thus, the shift of the speed-torque characteristic curve of the motor, which is dependent on the effective motor voltage as a parameter, causes the speed to drop through the torque. The drawback of this simple regulation process is its great load-dependency at low speeds.

According to EP 594,907, an electric motor having a different characteristic curve is operated at a high speed and a low speed, whereby the minimum speed is limited by a secondary impedance of the magnet coil that is triggered by the voltage of the magnet coil through a circuit formed by individual Z-diodes and a power switch. The speed, however, still remains load-dependent.

According to DE 19940409, an electric motor having an additional, lower speed stage is regulated to a constant speed by a voltage regulation that is phase angle-controlled through the torque on the basis of the characteristic curve of the motor, which is dependent on the effective motor voltage as a parameter. The higher torque that is consequently possible at lower speeds, however, can lie above a thermal limit torque in an electric motor that is configured for high speeds in terms of its thermal properties and its design.

According to DE 3612193, in an electric motor, in a hand-held power tool having speed regulation, when a switchover torque before the limit torque is exceeded, the regulation at the momentary effective motor voltage is switched off so that the speed drops as a function of the momentary characteristic curve of the motor in a way that is clearly perceptible to the user.

Moreover, according to DE 19609986 C1, an electric motor, in a hand-held power tool, is temporarily interrupted with drive pauses when a limit torque is exceeded until the user switches it off and, during these pauses, the hand-held power tool can only partially be used as intended.

SUMMARY OF THE INVENTION

The objective of the invention is to achieve a speed regulation for a lower speed until a limit torque is reached.

In accordance with the invention, an electric motor, preferably a series-wound electric motor, that is connected via a circuit to a source of current for purposes of speed regulation has at least one additional, lower regulated speed range, whereby in a first prioritized step, depending on the preselected speed, the regulation of the speed to a lower effective motor voltage has an upper limit, and in a second step, depending on the torque needed for the regulation to this constant speed, the effective motor voltage is regulated within the limited range.

Due to the limitation of the effective motor voltage to a value that is less than the effective operating voltage of the source of current, the entire family of the characteristic curves of the motor that are parameterized via the effective motor voltage are no longer available for the regulation of the electric motor. Consequently, critical characteristic motor lines that cause the limit torque to be exceeded, in the low speed range, are not available for the regulation of the speed to the low speed.

Preferably, the effective motor voltage is generated from the operating voltage of the source of current through a conventional phase angle control or phase sector control.

Preferably, in the phase angle control or phase sector control, the effective motor voltage has an upper limit due to another control input for the minimum phase angle, as a result of which this barrier can be simply integrated into a conventional phase angle control or phase sector control.

Preferably, when a switchover torque is reached before the limit torque, an even lower speed is preselected by the circuit, in a third step, and the process is continued with the first step, as a result of which, when the switchover torque is reached again, the electric motor is operated in discrete steps, each at a lower, constantly regulated speed. Accordingly, a hand-held power tool driven by this electric motor can still be fully used as intended.

Preferably, at a standstill with a speed of zero, the circuit generates a low effective motor voltage, which is continuously permissible for generating a residual torque when the electric motor is at rest and which is preferable for starting up again or, as an alternative, the effective current flow is interrupted, as a result of which it is reliably switched off.

BRIEF DESCRIPTION OF THE DRAWINGS

The preferred embodiment of the invention is explained in greater detail with reference to the attached drawings, wherein.

DETAILED DESCRIPTION OF THE INVENTION

Figure 1:
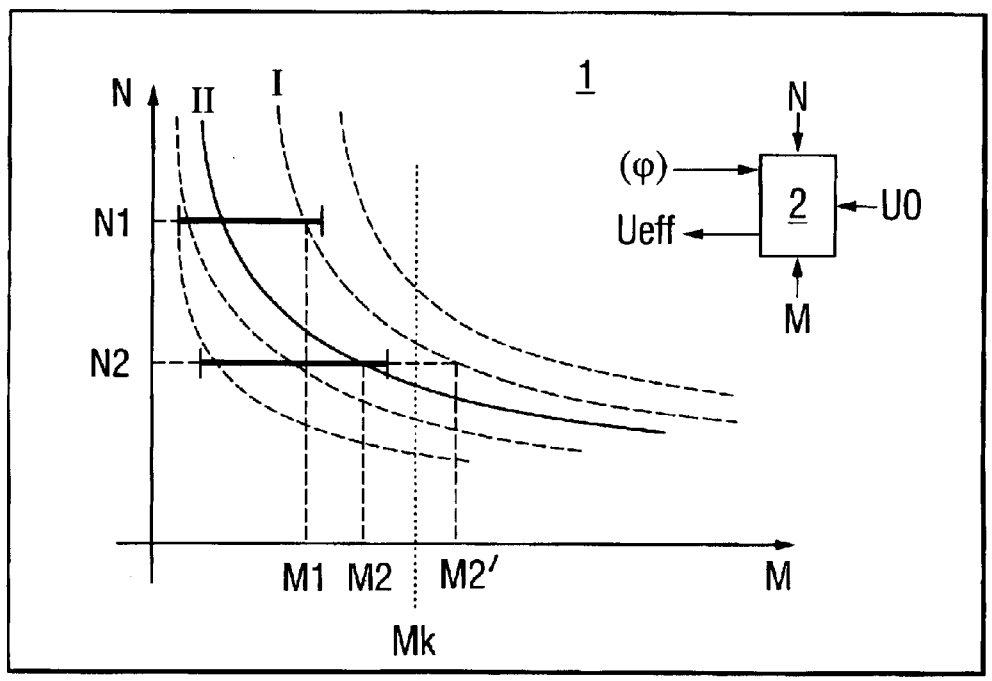
FIG. 1 illustrates a speed regulation through the effective motor voltage Ueff, in accordance with the invention.

According to FIG. 1, an electric motor 1 having a family of speed-torque characteristic lines I and II, which are dependent on an effective motor voltage Ueff as the parameter, is regulated by regulation of the speed N relative to the variable torque M such that, in addition to a first speed N1, there is an additional lower speed N2. The effective motor voltage Ueff is a function of the phase angle φ, of a phase angle control, of a circuit 2 connected to an operating voltage U0 from the source of current. The circuit is directly or indirectly regulated with the speed N and the torque M. Relative to a higher speed-torque characteristic motor line I, which is associated with a high effective motor voltage Ueff, the torque M1 associated with the speed N1 lies below the thermally permissible critical limit torque Mk, whereas the torque M2' associated with the speed N2 lies above Mk. The control range (shown in boldface) associated with the speed N1 is thus permissible for the speed regulation. Relative to an additional lower speed N2, which is associated with a limited lower effective motor voltage Ueff having a lower speed-torque characteristic motor line II, I n a first step, according to the invention, the torque M2 associated with the speed N2 lies below a thermally permissible critical limit torque Mk, as a result of which, in a second step, the control range (shown in boldface) associated with the speed N2 is permissible for the speed regulation.

Figure 2:
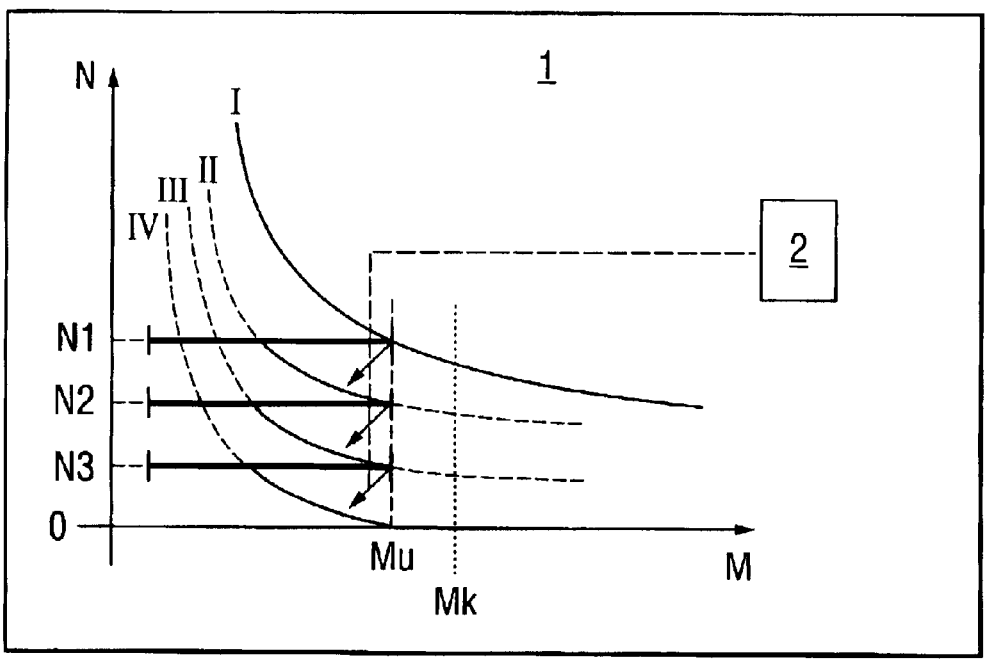
FIG. 2 illustrates a speed regulation in various stages, in accordance with the invention.

According to FIG. 2, when an electric motor 1 reaches a switchover torque Mu before the critical limit torque Mk, through the torque, in stages of the speed N, in a third step, the circuit 2 repeatedly preselects a speed N2 that is lower than a speed N1 or a speed N3 that is lower than a speed N2 and a speed N4 that is lower than a speed N3, thus limiting the available speed-torque characteristic lines I, II, III, IV. In a standstill with the speed N=0, a residual torque corresponding to the limit torque Mk is generated along the speed-torque characteristic line IV.

What is claimed is:

1. A method for regulating the speed of an electric motor (1) having a high speed (N1) to at least one additional, lower speed (N2, N3, N4), with a circuit (2) connected to a source of current for the regulation of the speed, the method comprising: a first prioritized step of regulating the speed of the electric motor to a lower effective motor voltage (Ueff) with an upper limit dependent on a preselected speed (N1, N2), and a second step of regulating the effective motor voltage (Ueff) within a limited range dependent on the torque (M) needed for the regulation to the preselected speed (N1, N2).

2. The method of claim 1, wherein the effective motor voltage (Ueff) in the circuit (2) is generated on the basis of an operating voltage (U0) from the source of current via one of a conventional phase angle control and a phase sector control.

3. The method of claim 2, wherein the upper limit is due to another control input for a minimum phase angle ($\phi$).

4. The method of claim 1, further comprising a third step of preselecting an even lower speed (N2, N3, N4), using the circuit (2), when a switchover torque (Mu) is reached before a limit torque (Mk), and continuing the regulation with the first prioritized step.

5. The method of claim 4, comprising the step of operating the electric motor (1) in discrete steps, each step at a lower, constantly regulated speed (N2>N3>N4) upon the switchover torque (Mu) being reached again.

6. The method of claim 5, comprising the step of using the circuit (2) to generate a low effective motor voltage (Ueff) when the electric motor (1) is at a standstill with a speed (N) of zero.

7. The method of claim 5, comprising the step of using the circuit (2) to interrupt the effective current flow when the electric motor is at a standstill with a speed (N) of zero.

\* \* \* \* \*